United States Patent
Guo et al.

(10) Patent No.: US 9,966,777 B2
(45) Date of Patent: May 8, 2018

(54) MODULAR MULTILEVEL CONVERTER FOR HYBRID ENERGY STORAGE

(71) Applicant: NEC Laboratories America, Inc., Princeton, NJ (US)

(72) Inventors: Feng Guo, Columbus, OH (US); Ratnesh Sharma, Fremont, CA (US)

(73) Assignee: NEC Corporation (JP)

( * ) Notice: Subject to any disclaimer, the term of this patent is extended or adjusted under 35 U.S.C. 154(b) by 445 days.

(21) Appl. No.: 14/802,564

(22) Filed: Jul. 17, 2015

(65) Prior Publication Data
US 2016/0020628 A1 Jan. 21, 2016

Related U.S. Application Data

(60) Provisional application No. 62/025,514, filed on Jul. 17, 2014.

(51) Int. Cl.
H02J 7/00 (2006.01)
H02M 7/537 (2006.01)
H02M 7/483 (2007.01)

(52) U.S. Cl.
CPC ........... *H02J 7/0065* (2013.01); *H02M 7/483* (2013.01); *H02M 7/537* (2013.01); *H02M 2007/4835* (2013.01)

(58) Field of Classification Search
CPC ...... H02J 7/0065; H02M 7/483; H02M 7/537; H02M 2007/4835
See application file for complete search history.

(56) References Cited

U.S. PATENT DOCUMENTS

| | | | |
|---|---|---|---|
| 8,760,122 B2 | 6/2014 | Demetriades | |
| 8,854,843 B2* | 10/2014 | Trainer | H02J 3/36 363/35 |
| 8,867,244 B2* | 10/2014 | Trainer | H02J 3/1857 363/65 |
| 9,065,299 B2* | 6/2015 | Trainer | H02J 3/36 |
| 2008/0205093 A1 | 8/2008 | Davies et al. | |
| 2014/0002048 A1 | 1/2014 | Pang et al. | |
| 2014/0362622 A1* | 12/2014 | Nademi | H02M 7/219 363/78 |
| 2015/0162848 A1* | 6/2015 | Harnefors | H02J 3/1814 363/78 |

(Continued)

OTHER PUBLICATIONS

F. Ciccarelli, G. Clemente, and D. Iannuzzi, "Energy storage management control based on supercapacitors using a modular multilevel inverter topology for electrical vehicles," International Conference on Clean Electrical Power (ICCEP), Jun. 2013, pp. 170-176.

(Continued)

*Primary Examiner* — Jared Fureman
*Assistant Examiner* — Emmanuel R Dominique
(74) *Attorney, Agent, or Firm* — Joseph Kolodka

(57) ABSTRACT

A modular multilevel converter for hybrid energy storage includes a battery. Three phases are connected in serial to the battery and in parallel to one another, each phase having two arms of sub-modules and buffer inductors. Each of the sub-modules includes a half-bridge and an ultracapacitor. A control module is configured to control the battery output power and ultracapacitor output power independently.

15 Claims, 4 Drawing Sheets

(56) References Cited

U.S. PATENT DOCUMENTS

2016/0268915 A1* 9/2016 Lin .................. H02M 1/32
2017/0033708 A1* 2/2017 Elserougi ............. H02H 7/1257

OTHER PUBLICATIONS

M. Glinka and R. Marquardt, "A new AC/AC Multilevel Converter Family," IEEE Trans. on Industrial Electronics, vol. 52, No. 3, pp. 662-669, Jun. 2005.

A. Lesnicar, and R. Marquardt, "A new modular voltage source inverter topology," in Proc. of the 10th European Conference on Power Electronics and Applications (EPE), Toulouse, France, Sep. 2003.

T. Martel and A. Rufer, "Electric vehicle driving and fast charging system based on configurable modular multilevel converter (CMMC)," in Proc. the 15th European Conference on Power Electronics and Applications (EPE), Jun. 2013, pp. 1-10.

S. D'Arco, L. Piegari, and P. Tricoli, "Power and balancing control considerations on modular multilevel converters for battery electric vehicles," in Proc. the 15th European Conference on Power Electronics and Applications (EPE), Sep. 2013, pp. 1-9.

I. Trintis, S. Munk-Nielsen, and R. Teodorescu, "A new modular multilevel converter with integrated energy storage," 37th Annual Conference on IEEE Industrial Electronics Society, Nov. 2011, pp. 1075-1080.

M. Schroeder, S. Henninger, J. Jaeger, A. Ras, H. Rubenbauer, and H. Leu, "Integration of batteries into a modular multilevel converter," in Proc. the 15th European Conference on Power Electronics and Applications (EPE), 2013, pp. 1-12.

A. Hillers, and J. Biela, "Optimal design of the modular multilevel converter for an energy storage system based on split batteries," in Proc. the 15th European Conference on Power Electronics and Applications (EPE), Sep. 2013, pp. 1-11.

M. Vasiladiotis and A. Rufer, "Analysis and control of Modular Multilevel Converters with integrated battery energy storage," IEEE Trans. Power Electronics, IEEE Trans. on Power Electronics, vol. 30, No. 1, pp. 163-175, Jan. 2015.

R. Dougal, S. Liu, and R. White, "Power and life extension of battery-ultracapacitor hybrids," IEEE Trans. Components and Packaging Technologies, vol. 25, No. 1, pp. 120-131, Mar. 2002.

L. Gao, R. Dougal, and S. Liu, "Power enhancement of an actively controlled battery/ultracapacitor hybrid," IEEE Trans. Power Electronics, vol. 20, No. 1, pp. 236-243, Jan. 2005.

* cited by examiner

MODULAR MULTILEVEL CONVERTER FOR HYBRID ENERGY STORAGE

RELATED APPLICATION INFORMATION

This application claims priority to provisional application 62/025,514, filed Jul. 17, 2014, the contents thereof being incorporated herein by reference.

BACKGROUND OF THE INVENTION

To support the penetration of renewable energy generation in the power grid and to provide ancillary functions for system operation, the demand for energy storage systems (ESSes) has greatly increased. Batteries have a relatively large energy density and are commonly used in this application. However, batteries have a small power density and cannot be rapidly charged or discharged without harming the life time. This limits the performance of the battery based ESS. In contrast, UltraCapacitors (UCs) have a large power density, and can provide instantaneous high charge and discharge power. However, UCs have a low energy density and cannot provide energy in a long time frame. A Hybrid ESS (HESS) that has both battery and UC combines the advantages of the two energy sources, thus provides excellent power and energy capabilities. Meanwhile, such a hybrid system can effectively extend the battery life by reducing the charging and discharging cycles.

There are generally three types of circuit topologies for HESS using batteries and UCs. In a first topology, the battery and UC are directly connected at a direct current (DC) side of an inverter. Because the voltages of the battery and the UC are always the same in this topology, the power flow of the two sources cannot be controlled independently.

As an improvement, a DC/DC converter is inserted between the battery and the UC, so that the power of one of the energy sources can be controlled directly. By connecting a DC/DC converter to each energy source, the power of both energy sources is directly controlled. However, the additional DC/DC converters increase the cost of the system and, at the same time, introduce additional power loss. Furthermore, with increased power and energy ratings of the HESS for gird-level applications, the power semiconductor devices and passive components involved may become unsuitable to handle high voltages and currents.

For high power ESS, the topology of a Modular Multilevel Converter (MMC) has become a promising candidate. The modular structure of the MMC enables the usage of low voltage and high performance switching devices, provides an easy way to add redundancy to the system, and is scalable to different voltage and power levels. In addition, the multilevel output waveform decreases the total harmonic distortion, shrinks the size of the output filter, and increases the system efficiency by reducing the switching frequency. For ESS applications, in some solutions, a battery is integrated with a half bridge in each sub-module, and there is no power source connected to the dc bus. In this configuration, the battery life time will be affected by the large low frequency current flowing through the sub-module. To solve this issue, a DC/DC converter is inserted between the battery and the half bridge in each sub-module. However, this configuration significantly increases the number of switches and passive components in the circuit. For HESS applications, a MMC has been proposed with both battery and UC. The battery is put at the DC link, while the UC is integrated in the sub-module with a DC/DC converter and a half bridge. However, as described above, this configuration uses a large number of switches and passive components.

BRIEF SUMMARY OF THE INVENTION

A modular multilevel converter for hybrid energy storage includes a battery. Three phases are connected in serial to the battery and in parallel to one another, each phase having two arms of sub-modules and buffer inductors. Each of the sub-modules includes a half-bridge and an ultracapacitor. A control module is configured to control the battery output power and ultracapacitor output power independently.

A method for controlling a modular multilevel converter based hybrid energy storage system is shown. The system has a battery with three phases connected in serial to the battery and in parallel to one another. Each phase includes two arms of sub-modules and buffer inductors, where each of said sub-modules includes a half-bridge and an ultracapacitor. The method includes determining a number ($n_P$ and $n_N$) of sub-modules to be inserted in a respective upper and lower arm of a phase in the modular multilevel converter. It is determined whether current in each respective arm is greater than zero. Sub-modules to engage for each arm are selected based on ultracapacitor voltages for each sub-module in the respective arm in accordance with the determination of whether the current in the respective arm is greater than zero. Gate signals are generated to engage the selected sub-modules.

DETAILED DESCRIPTION

Embodiments of the present principles provide a Modular Multilevel Converter (MMC) for a hybrid energy storage system (HESS) having three phases, each phase having two arms. In each arm, sub-modules are connected in series with a buffer inductor. An ultracapacitor (UC) with a low voltage level is integrated with a half bridge in each sub-module. A high-voltage battery pack is put at a direct current (DC) bus.

Compared to a conventional MMC, the proposed embodiments have different principles of operation. Because of the integrated energy storage element, the average active power of each sub-module is not necessarily equal to zero and the power from the DC side is not necessarily equal to the alternating current (AC) side. Because the voltage of the UC changes with the state of charge (SoC), and because there is no DC/DC stage in each sub-module, the sum of UC voltages in one arm will not necessarily be equal to the battery voltage at the DC bus.

Figure 1:
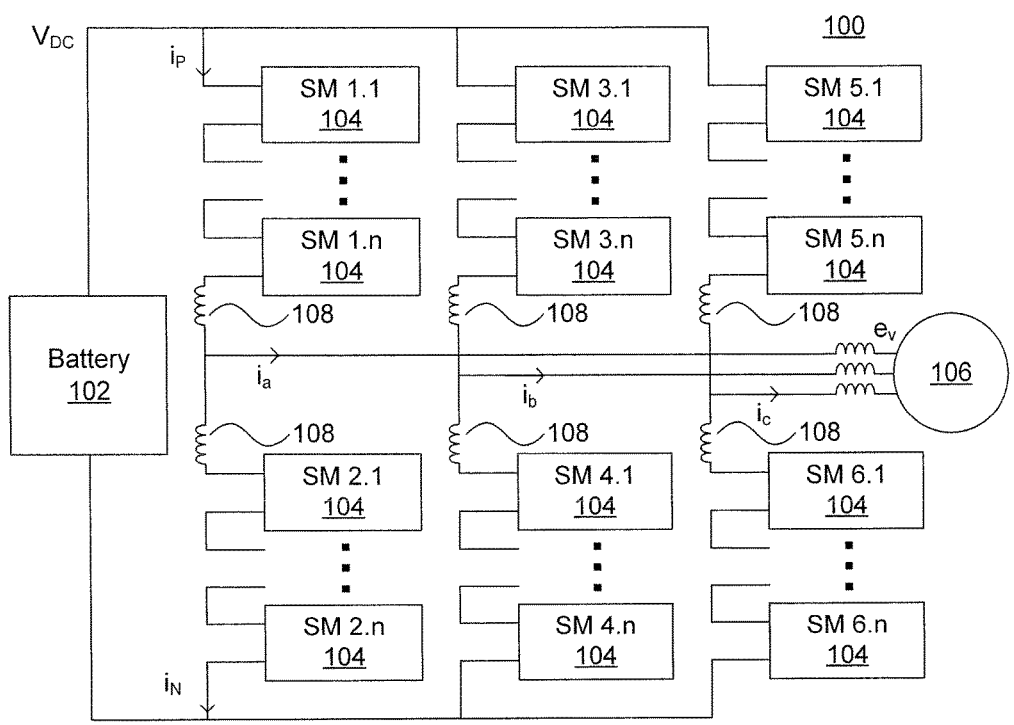
FIG. 1 is a diagram of a modular multilevel converter in accordance with the present principles.

Referring now to FIG. 1, a diagram of an MMC 100 in accordance with the present embodiments is shown. A battery 102 is connected in serial with groups of sub-modules 104. The battery 102 is a high-voltage battery pack that may include multiple individual cells. Each group of sub-modules 104 includes n sub-modules, each arranged in serial and connected to a utility grid 106. Half of the sub-modules 104 (those shown as 1.x, 3.x, and 5.x) are connected to the positive terminal of the battery 102, while the other half of the sub-modules 104 (those shown as 2.x, 4.x, and 6.x) are connected to the negative terminal of the battery 102.

The MMC 100 includes three phases (e.g., sub-modules 1.x and 2.x, sub-modules 3.x and 4.x, and sub-modules 5.x and 6.x). In each phase, two identical strings of sub-modules 104 are included with one buffer inductor 108. Each of the phases produces one output that goes to the utility grid 106.

Figure 2:
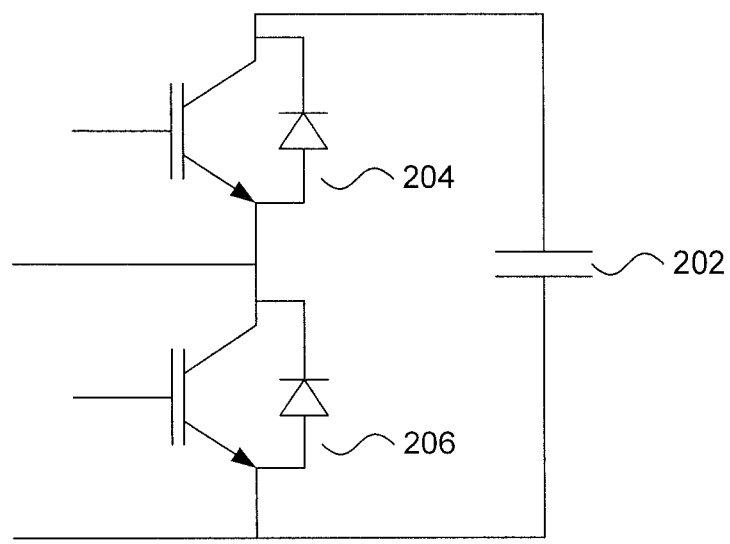
FIG. 2 is a diagram of a sub-module of a modular multilevel converter in accordance with the present principles.

Referring now to FIG. 2, a diagram of an individual sub-module 104 is shown. A low-voltage UC 202 is used with two semiconductor switches 204 and 206. The semiconductor switches 204 and 206 may be an insulated-gate bipolar transistor (IGBT) or a metal-oxide semiconductor field-effect transistor (MOSFET). When the upper switch 204 is on, the sub-module 104 is inserted into the circuit and the output voltage is the UC 202 voltage. While when the lower switch 206 is on, the sub-module 104 is bypassed from the circuit and the output voltage is zero. The use of a half bridge in the sub-modules 104 reduces the number of semiconductor switches and passive components in the MMC 100 and increases the efficiency of the whole system.

Figure 3:
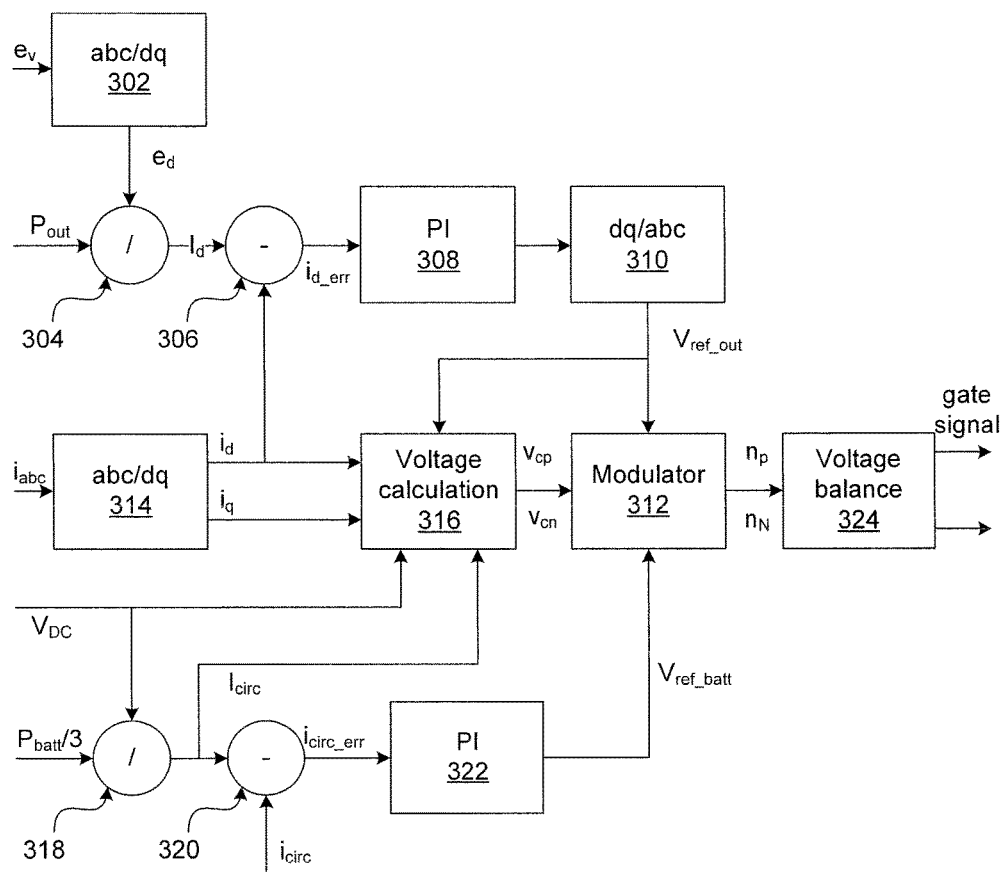
FIG. 3 is a diagram of a high-level control for a modular multi-level converter in accordance with the present principles.

Referring now to FIG. 3, a diagram of a control module for one phase of the MMC 100 is shown. Because all three phases are symmetric, only one such phase is shown. There are two levels of control employed. At a high level, the circulating current $i_{circ}$ and output current $i_{abc}$ are controlled independently, so the power from the battery 102 and UC 202 can also be controlled independently. At low level, a sub-module 104 voltage balancing control 324 is implemented to ensure that all UCs 202 in an arm sustain the same voltage. In FIG. 3, all components before the voltage balance block 324 implement the high-level control.

Based on the power needed from the battery 102 and the UC 202, the number of sub-modules inserted into the upper and lower arm of the MMC 100 ($n_P$ and $n_N$) at any given time is derived in the high level control.

A three-phase voltage $e_v$ is fed to abc/dq block 302 which converts the three-phase voltage from abc into dq0. After transformation, the 'd,' axis component of the three-phase voltage $e_d$ is used to divide an output power reference $P_{out}$ in the divider 304 to produce a 'd' axis component of three-phase output current reference $I_d$. A three-phase output current $i_{abc}$ is supplied to an abc/dq converter 314 to convert the current into dq0 coordinates. After transformation, the 'd,' axis component of the three-phase current $i_d$ is subtracted from the three-phase output current reference $I_d$ at combiner 306, the output of which is provided to a proportional-integral (PI) controller 308. The output of the PI controller 308 is passed to a dq/abc converter 310 to produce an output-power-related voltage reference in abc coordinates, $V_{ref\_out}$, which is sent to the modulator 312.

A battery power reference $$\frac{P_{batt}}{3}$$

is provided to the divider 318, where it is divided by a DC bus voltage $V_{DC}$, which is also the battery voltage, to find a reference for the circulating current $I_{circ}$. In the meantime, the actual circulating current $$i_{circ} = \frac{i_P + i_N}{2}$$

is introduced, where $i_P$ is the current in the upper arm of the MMC 100 and $i_N$ is the current in the lower arm of the MMC 100. The circulating current $i_{circ}$ is subtracted from $I_{circ}$ at the combiner 320 and processed at PI block 322 to produce a battery-power-related voltage reference, $V_{ref\_batt}$, which is sent to the modulator 312.

Using the output-power-related voltage reference $V_{ref\_out}$, the 'd' axis component of the three phase current $i_d$, the 'q' axis component of the three phase current $i_q$, the DC bus voltage $V_{DC}$, and the circulating current reference $I_{circ}$, the UC voltage in each sub-module 104 of the upper arm and lower arm ($v_{CP}$ and $V_{CN}$ respectively) can be calculated in block 316. Using the upper arm as an example, $$v_{CP} = \sqrt{\begin{array}{c} \frac{2}{NC}\left(E_{CP}^0 + \left(\frac{V_{DC}I_{circ}}{2} - \frac{V_{an}I_a\cos\varphi}{4} - R_cI_{circ}^2 - \frac{R_cI_a^2}{8}\right)t - \\ \frac{V_{an}I_{circ}\sin(\omega t)}{\omega} - \frac{R_aI_{circ}I_a\sin(\omega t + \varphi)}{\omega} - \frac{L_cI_{circ}I_a\cos(\omega t + \varphi)}{2} + \\ \frac{V_{DC}I_a\sin(\omega t + \varphi)}{4\omega} - \frac{V_{an}I_a\sin(2\omega t + \varphi)}{8\omega} - \frac{L_cI_a^2\cos(2\omega t + 2\varphi)}{16} - \\ \frac{R_cI_a^2\sin(2\omega t + 2\varphi)}{16\omega} \end{array}}$$

where N is the number of sub-modules 104 in each arm, C is the capacitance of each UC 202, $E_{CP}^0$ is the integration constant, $V_{an}$ is the amplitude of the phase output voltage, $I_a$ is the amplitude of the phase output current, $\omega$ is the angular speed, and $R_c$ and $L_c$ are the resistance and inductance of the buffer inductor 108, respectively. $\varphi$ is the power factor and can be obtained from $$\varphi = \arctan\left(\frac{i_q}{i_d}\right).$$

A similar equation is used for the lower arm.

With the output-power-related voltage reference $V_{ref\_out}$, battery-power-related voltage reference $V_{ref\_batt}$, the upper arm UC voltage $v_{CP}$, and the lower arm UC voltage $v_{CN}$, a modulator 312 is used to calculate the inserted number of sub-modules 104 for the upper and lower arms, $n_P$ and $n_N$.

The inserted numbers of sub-modules 104 for the respective arms, $n_P$ and $n_N$, are sent to the low-level controller 324 to perform voltage balancing between the sub-modules 104 as well as gate signal generation.

Figure 4:
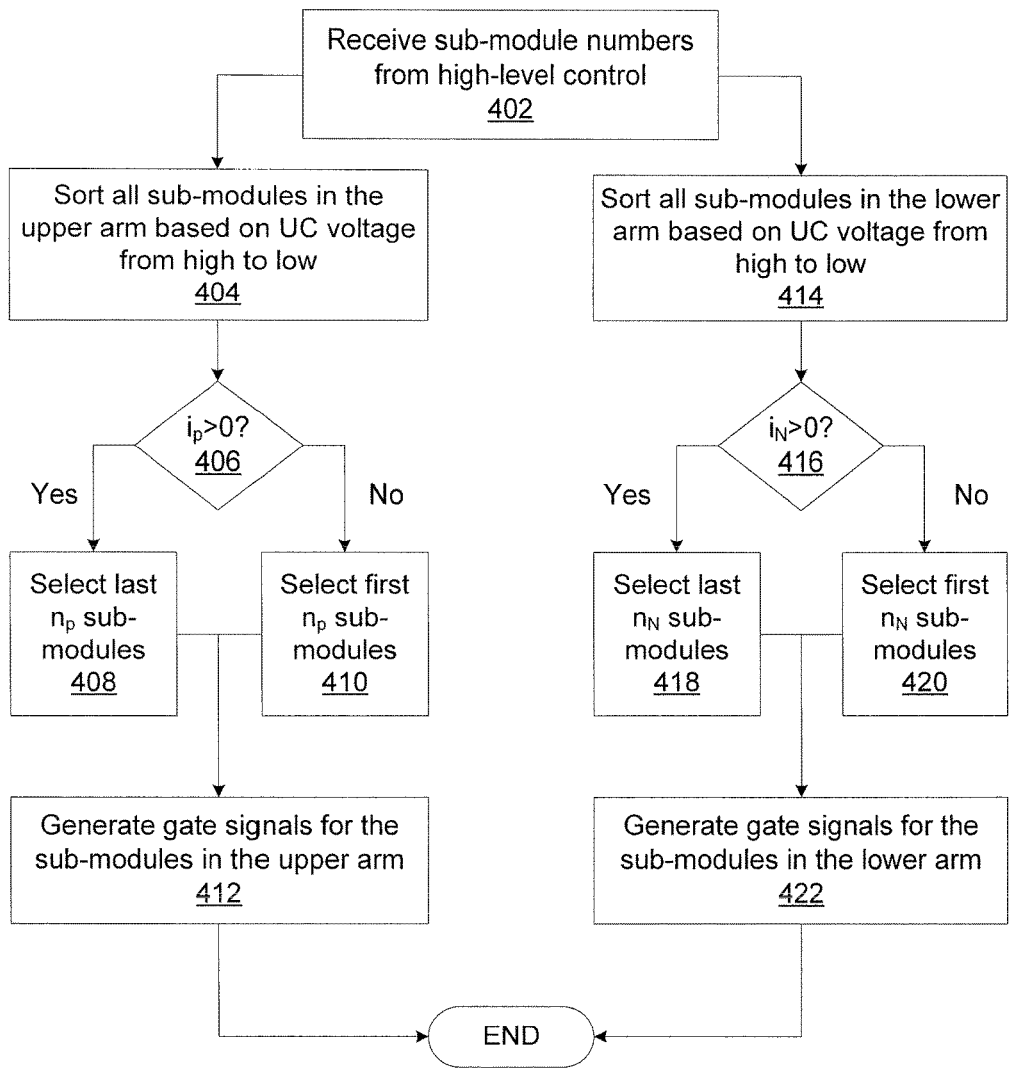
FIG. 4 is a method of low-level control for a modular multi-level converter in accordance with the present principles.

Referring now to FIG. 4, a block/flow diagram of the operation of low level control and voltage balancing is shown. Block 402 receives inserted numbers of sub-modules 104 for the upper and lower arms of the MMC 100. Separate branches handle the consideration of the respective arms. For the upper-arm branch, block 404 sorts all sub-modules 104 in the upper arm by UC voltage from high to low. Block 406 determines whether the upper arm current $i_P$ is greater than zero. If so, block 408 selects the last $n_P$ sub-modules 104 (i.e., those with the lowest UC voltages). If not, block 410 selects the first $n_P$ sub-modules 104 (i.e., those with the highest UC voltages). Block 412 then generates gate signals for the sub-modules 104 in the upper arm.

A similar process is used for the lower-arm branch. Block 414 sorts all of the sub-modules 104 in the lower arm by UC voltage from high to low. Block 416 determines whether the lower arm current $i_N$ is greater than zero. If so, block 418 selects the last $n_N$ sub-modules 104 (i.e., those with the lowest UC voltages). If not, block 420 selects the first $n_N$ sub-modules 104 (i.e., those with the highest UC voltages). Block 422 then generates gate signals for the sub-modules 104 in the lower arm.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or storage devices through intervening private or public networks. Modems, cable modem and Ethernet cards are just a few of the currently available types of network adapters.

Compared to conventional HESS technologies, the MMC 100 of the present embodiments has several advantages. Direct DC/AC conversion is realized, so overall system efficiency can be increased. The MMC 100 eliminates a DC inductor and greatly shrinks the size of a DC-link capacitor, reducing the cost of DC-side passive components. The MMC is also scalable to mega-voltage and mega-watt applications, making it suitable for grid energy storage, and furthermore provides an easy and low-cost way to add redundancy and increase the reliability of the system. The multilevel output waveform decreases the total harmonic distortion, shrinks the size of the output filter, and increases system efficiency by reducing switching frequency.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A modular multilevel converter for hybrid energy storage, comprising:
   a battery;
   three phases connected in serial to the battery and in parallel to one another, each phase comprising two arms of sub-modules and buffer inductors, wherein each of said sub-modules comprises a half-bridge and an ultracapacitor;
   a control module configured to control the battery output power and ultracapacitor output power independently, the control module comprising:
     a high level control configured to determine a number of sub-modules ($n_P$ and $n_N$) to be inserted in respective upper and lower arms of a phase in the modular multilevel converter, the high level control comprising:
       an output power control configured to regulate the actual output power to follow a reference output power;
       a battery power control configured to regulate the actual battery power to follow a reference battery power;
       an ultracapacitor voltage estimator configured to estimate upper and lower arm ultracapacitor voltages ($v_{CP}$ and $v_{CN}$) by a output-power-related voltage reference $V_{ref\_out}$, a 'd' axis component of a three phase current $i_d$, a 'q' axis component of the three phase current $i_q$, a DC bus voltage $V_{DC}$, and a circulating current reference $I_{circ}$; and
       a modulator configured to generate a number of sub-modules ($n_P$ and $n_N$) in a respective upper and lower arm; and
     a low level control configured to balance sub-modules voltage and generate gate signals.

2. The modular multilevel converter of claim 1, wherein each arm of each phase further comprises a buffer inductor.

3. The modular multilevel converter of claim 1, wherein each sub-module is configured such that the ultracapacitor is connected across two semiconductor switches.

4. The modular multilevel converter of claim 1, wherein the sub-modules in each arm are arranged serially.

5. The modular multilevel converter of claim 1, wherein the output power control is configured to sense and convert the three-phase voltage $e_v$ from abc into dq0 coordinates, to obtain a 'd' axis component of a three-phase output current reference $I_d$ by dividing the reference output power $P_{out}$ by a 'd' axis component of the three-phase voltage $e_d$, to sense and convert a three-phase current $i_{abc}$ from abc into dq0 coordinates, to obtain an error current signal $i_{d\_err}$ by subtracting a 'd' axis component of the sensed three-phase output current $i_d$ from the current reference $I_d$, and to obtain an output-power-related voltage reference $V_{ref\_out}$ by sending the error current signal $i_{d\_err}$ through a proportional-integral controller and then a dq/abc converter.

6. The modular multilevel converter of claim 1, wherein the battery power control is configured to divide the reference battery power $$\frac{P_{batt}}{3}$$

by a DC bus voltage $V_{DC}$ to obtain a circulating current reference $I_{circ}$, to calculate an circulating current $i_{circ}$ by adding an upper arm current $i_p$ and a lower arm current $i_N$, and then dividing the sum thereof by two, to obtain an error current signal by subtracting the actual circulating current $i_{circ}$ from the circulating current reference $I_{circ}$, and to obtain a battery-power-related voltage reference $V_{ref\_batt}$ by sending the error current signal $i_{circ\_err}$ through a proportional-integral controller.

7. The modular multilevel converter of claim 1, wherein the modulator is configured to calculate the inserted number of sub-modules for the upper and lower alms ($n_P$ and $n_N$) utilizing an output-power-related voltage reference $V_{ref\_out}$, a battery-power-related voltage reference $V_{ref\_batt}$, an upper arm ultracapacitor voltage $v_{CP}$, and a lower arm ultracapacitor voltage $v_{CN}$.

8. The modular multilevel converter of claim 1, wherein the low level control is configured to determine whether a current in each respective arm is greater than zero, to select sub-modules to engage for each arm based on ultracapacitor voltages for each sub-module in the respective arm in accordance with the determination of whether the current in the respective arm is greater than zero, and to generate gate signals to engage the selected sub-modules.

9. The modular multilevel converter of claim 8, wherein the low level control is further configured to select $n_P$ sub-modules in the upper arm having lowest ultracapacitor voltages if the upper arm current is greater than zero, to select $n_P$ sub-modules in the upper arm having highest ultracapacitor voltages if the upper arm current is less than zero, to select $n_N$ sub-modules in the lower arm having lowest ultracapacitor voltages if the lower arm current is greater than zero, and to select $n_N$ sub-modules in the lower arm having highest ultracapacitor voltages if the lower arm current is less than zero.

10. The modular multilevel converter of claim 8, wherein the low level control is configured to generate gate signals by supplying a gate voltage to two semiconductor switches in a half-bridge configuration of the sub-modules.

11. A method for controlling a modular multilevel converter based hybrid energy storage system, said the system having a battery, three phases connected in serial to the battery and in parallel to one another, each phase comprising two arms of sub-modules and buffer inductors, wherein each of said sub-modules comprises a half-bridge and an ultracapacitor, comprising the steps of:
  determining a number ($n_P$ and $n_N$) of sub-modules to be inserted in a respective upper and lower arm of a phase in the modular multilevel converter, wherein determining the number of sub-modules comprises:
    regulating an actual output power to follow a reference output power;
    regulating an actual battery power to follow a reference battery power;
    estimating an upper and lower arm ultracapacitor voltages ($v_{CP}$ and $v_{CN}$) based on an output-power-related voltage reference $V_{ref\_out}$, a 'd' axis component of a three phase current $i_d$, a 'q' axis component of the three phase current $i_q$, a DC bus voltage $V_{DC}$, and a circulating current reference $I_{circ}$; and
    generating a number of sub-modules ($n_P$ and $n_N$) in a respective upper and lower arm;
  determining whether a current in each respective arm is greater than zero;
  selecting sub-modules to engage for each arm based on ultracapacitor voltages for each sub-module in the respective arm in accordance with the determination of whether the current in the respective arm is greater than zero; and
  generating gate signals to engage the selected sub-modules.

12. The method of claim 11, wherein regulating the actual output power comprises:
  sensing and converting a three-phase voltage e from abc into dq0 coordinates;
  obtaining a 'd' axis component of a three-phase output current reference $I_d$ by dividing the reference output power $P_{out}$ by a axis component of the three-phase voltage $e_d$;
  sensing and converting a three-phase current $i_{abc}$ from abc into dq0 coordinates;
  obtaining an error current signal $i_{d\_err}$ by subtracting a 'd' axis component of the sensed three-phase output current $i_d$ from the current reference $I_d$; and
  obtaining an output-power-related voltage reference $V_{ref\_out}$ by sending the error current signal $i_{d\_err}$ through a proportional-integral controller and then a dq/abc converter.

13. The method of claim 11, wherein regulating the actual battery power comprises:
  dividing the reference battery power $$\frac{P_{batt}}{3}$$

by a DC bus voltage $V_{DC}$ to obtain a circulating current reference $I_{circ}$;
  calculating an circulating current $i_{circ}$ by adding an upper arm current $i_p$ and a lower arm current $i_N$, and then dividing the sum thereof by two;
  obtaining an error current signal $i_{circ\_err}$ by subtracting the actual circulating current $i_{circ}$ from the circulating current reference $I_{circ}$; and
  obtaining a battery-power-related voltage reference $V_{ref\_batt}$ by sending the error current signal $i_{circ\_err}$ through a proportional-integral controller.

14. The method of claim 11, wherein the upper and lower arm ultracapacitor voltages ($v_{CP}$ and $v_{CN}$) are estimated based on an output-power-related voltage reference $V_{ref\_out}$, a 'd' axis component of a three phase current $i_d$, a 'q' axis component of the three phase current $i_q$, a DC bus voltage $V_{DC}$, and a circulating current reference $I_{circ}$.

15. The method of claim 11, wherein selecting the sub-modules comprises:
  selecting the $n_P$ sub-modules in the upper arm having the lowest ultracapacitor voltage if the upper arm current is greater than zero;
  selecting the $n_P$ sub-modules in the upper arm having the highest ultracapacitor voltage if the upper arm current is less than zero;
  selecting the $n_N$ sub-modules in the lower arm having the lowest ultracapacitor voltage if the lower arm current is greater than zero; and
  selecting the $n_N$ sub-modules in the lower arm having the highest ultracapacitor voltage if the lower arm current is less than zero.

* * * * *